United States Patent
Herzog et al.

(10) Patent No.: US 6,868,427 B2
(45) Date of Patent: Mar. 15, 2005

(54) MANAGING CUSTOMIZABLE SETTINGS IN COMPUTER SYSTEMS

(75) Inventors: Wolfgang Herzog, Reilingen (DE); Frank Kollnischko, Dielheim (DE); Wulf Kruempelmann, Altlussheim (DE)

(73) Assignee: SAP Aktiengesellschaft, Walldorf (DE)

( * ) Notice: Subject to any disclaimer, the term of this patent is extended or adjusted under 35 U.S.C. 154(b) by 437 days.

(21) Appl. No.: 10/157,953

(22) Filed: May 31, 2002

(65) Prior Publication Data

US 2003/0225741 A1 Dec. 4, 2003

(51) Int. Cl.⁷ .............................................. G06F 17/30
(52) U.S. Cl. ................................. 707/104.1; 709/203
(58) Field of Search .............................. 707/1, 2, 3, 4, 707/100, 104.1; 706/60; 709/223, 225, 201

(56) References Cited

U.S. PATENT DOCUMENTS

| | | | |
|---|---|---|---|
| 5,499,357 A | 3/1996 | Sonty et al. | 710/104 |
| 5,553,218 A | 9/1996 | Li et al. | 707/102 |
| 5,717,924 A | 2/1998 | Kawai | 707/102 |
| 5,838,918 A | 11/1998 | Prager et al. | 709/221 |
| 5,913,218 A | 6/1999 | Carney et al. | 707/200 |
| 5,950,190 A | 9/1999 | Yeager et al. | 707/3 |
| 6,047,279 A * | 4/2000 | Barrack et al. | 706/60 |
| 6,219,719 B1 * | 4/2001 | Graf | 710/1 |
| 6,330,586 B1 * | 12/2001 | Yates et al. | 709/201 |
| 6,366,917 B1 | 4/2002 | Herbert | 707/100 |
| 6,463,430 B1 * | 10/2002 | Brady et al. | 707/3 |
| 6,473,794 B1 * | 10/2002 | Guheen et al. | 709/223 |
| 6,532,491 B1 * | 3/2003 | Lakis et al. | 709/223 |
| 6,560,704 B2 | 5/2003 | Dieterman et al. | 713/100 |
| 6,792,462 B2 * | 9/2004 | Bernhardt et al. | 709/225 |

FOREIGN PATENT DOCUMENTS

GB 2334601 A 8/1999

OTHER PUBLICATIONS

SAP Service Marketplace publication entitled "Customizing Scout," Published Mar. 19, 2001.

* cited by examiner

Primary Examiner—Diane D. Mizrahi
Assistant Examiner—Yicun Wu
(74) Attorney, Agent, or Firm—Fish & Richardson P.C.

(57) ABSTRACT

A computer program product for managing customization is described. The product, includes instructions to cause a processor to access a customizable parameter collection that includes a collection of potentially-customizable parameters, identify a first computer system and a second computer system that are potentially impacted by a particular customizable parameter in the collection, and retrieve settings of the particular customizable parameter from the first computer system and second computer system. The computer program product may be tangibly stored on machine readable media.

7 Claims, 7 Drawing Sheets

PRODUCTS

| Name | Units | Size (cm) | Wt (kg) | Cost (Euro) |
|---|---|---|---|---|
| Prod. 915A | 0 | 7 | 5 | 12 |
| Prod. 915B | 0 | 12 | 9 | 18 |
| Prod. 915C | 1 | 13 | 7 | 18 |
| Prod. 918A | 3 | 9 | 3 | 14 |
| Prod. 918B | 0 | 6.5 | 3 | 11 |
| Prod. 921 | 8 | 6.5 | 3 | 11 |

FIG. 1

CUSTOMER RECORD FOR CUSTOMER A

| Product Requirements || Products Purchased |||
|---|---|---|---|---|
| Max Size (in) | Max Wt (kg) | Name | Units | Paid ($) |
| 2.8 | 8 | Prod. 915 | 2 | 6 |
| | | Prod. 918B | 1 | 9 |
| | | Prod. 918B | 1 | 7 |

MANAGING CUSTOMIZABLE SETTINGS IN COMPUTER SYSTEMS

BACKGROUND

This disclosure relates to managing the customization of computer systems.

A computer system may be customized to meet the specific requirements of a user. For example, the customizable parameters in a system may be customized to meet the requirements of a particular country, a particular industry, a particular company, or a particular department in a company so that the system accurately fulfills even highly specialized or localized needs. Examples of system customization include language parameter customization, unit parameter customization (e.g., metric versus English), format parameter customization (e.g., month/day/year versus day/month/year), work process parameter customization, and notation parameter customization.

Although system customization allows a system to meet one or more specific requirements of a user, system customization also complicates operations that span systems with differing customization settings, or the same system at different sites with differing customization settings. For example, if the customization setting of a particular class of data objects in two different systems or at two different sites is different, then data objects from this class may not be directly comparable or transferable.

SUMMARY

A computer system that includes a collection of potentially-customizable parameters can manage the customization of computer systems to allow the computer systems to smoothly transfer and compare data, and perform shared operations. In particular, a customization management system may access the collection of customizable parameters to identify objects and parameters in different systems that are potentially impacted by customization without having to examine every object or even all of the potentially impacted objects. Rather, a customization management computer system may examine the collection of potentially-customizable parameters and identify objects that are potentially impacted by customization of the customizable parameter. When a user wishes to check the customization of different systems, the customization management system can rapidly identify, from the collection, the classes of objects that have customizable parameters, and can compare member objects of the identified classes in the different systems. Moreover, when a user wishes to distribute customization to different systems, the customization management computer system can easily identify systems and data objects that are impacted by the customization by examining the collection of potentially-customizable parameters.

In a general aspect, a method for managing customization includes maintaining a customizable parameter collection and accessing the customizable parameter collection when managing customization. The customizable parameter collection includes a collection of potentially-customizable parameters associated with identification of objects impacted by the potentially-customizable parameters customization.

Implementations of this or any other aspect may include one or more of the following features. The potentially-customizable parameters may be stored in a table with the identification of objects impacted by the potentially-customizable parameters. The objects impacted by the potentially-customizable parameters may be identified by names in the table. The objects may be located in computer systems that are remote from the customizable parameter collection. Accessing the customizable parameter collection may include accessing the customizable parameter collection to identify a first object and a second object impacted by a particular parameter from the collection of potentially-customizable parameters.

Managing customization may include retrieving a first setting of the particular parameter for the first object and retrieving a second setting of the particular parameter for the second object. The retrieved first setting may be compared with the second setting to determine if the first setting is compatible with the second setting. In particular, the retrieved first setting may be compared with the second setting to determine if the first setting is identical to the second setting.

The results of the comparison may be presented on a visual display for a user, and the first setting may be caused to change to be compatible with the second setting. The first setting may be retrieved from a first system, and the second setting may be retrieved from a second system. The first system may be remote from the second system.

In another general aspect, a computer program product for managing customization includes instructions to cause a processor to access a customizable parameter collection that includes a collection of potentially-customizable parameters, identify a first computer system and a second computer system that are potentially impacted by a particular customizable parameter in the collection, and retrieve settings of the particular customizable parameter from the first computer system and the second computer system. The computer program product may be tangibly stored on machine readable media.

Implementations of this or any other aspect may include one or more of the following features. The instructions may cause a processor to compare the retrieved settings of the particular customizable parameter and to display a result of the comparison between the retrieved settings of the particular customizable parameter. The instructions may cause a processor to identify a first object in the first computer system and a second object in the second computer system. The first object and the second object maybe potentially impacted by the particular customizable parameter. Settings of the particular customizable parameter may be retrieved from the first object and the second object.

The collection of potentially-customizable parameters may include unit parameters related to a unit setting in the first computer system and the second computer system or work process parameters related to a work process setting in the first computer system and the second computer system. The potentially-customizable parameters may be stored in a table with information identifying objects impacted by the potentially-customizable parameters. The objects may be located in systems that are remote from the customizable parameter collection.

In another general aspect, a system for managing customization includes a customizable parameters collection and communications logic to retrieve customization settings of the one or more customizable parameters included in the customizable parameters collection. The collection includes one or more customizable parameters that are potentially customizable.

Implementations of this or any other aspect may include one or more of the following features. For example, the customizable parameters collection may include distinguishing characteristics of one or more objects that are potentially impacted by customization of the one or more customizable parameters. The distinguishing characteristics may be names of the one or more objects. The one or more objects may be from one or more systems that perform inter-system operations, or the objects may be from a single system operating at two different sites.

The system may also include comparison logic to compare retrieved customization settings of the one or more customizable parameters. The system may also include a display device and display logic to display a result of the comparison of the retrieved customization settings. The system may also include a comparison collection that includes a result of a previous comparison of customization settings of one or more customizable parameters.

The system may also include selection logic to receive a selection of the result of the previous comparison in the comparison collection and display logic to display the selected result of the previous comparison.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

The described systems and techniques may be used to customize computer systems by controlling the customization settings of parameters of objects used by the computer systems. Many systems are first customized during installation. For example, during installation, a computer system may offer a user a set of default settings and the ability to change the settings. The user may either accept the default settings or may select different settings according to the user's particular needs. The system may perform a cursory check of the technical validity of user-selected settings, such as, for example, ensuring that the spelling of the settings is correct.

The computer system may interact with other computer systems in a system landscape in which the computer systems exchange data to run different applications or the same application(s) at sites that are remote from each other. A computer system in the landscape that receives new or updated customization settings may propagate the settings to the other computer systems in the landscape. For example, a computer system may generate a "transport request" that transmits new settings to the other systems and causes them to customize corresponding parameters to the transmitted settings. In theory, if the propagation of settings throughout the landscape occurs every time that a setting is changed, the settings in the landscape will always remain compatible.

In practice, incompatibilities often arise between settings in a computer system landscape. For example, the propagation of settings throughout the landscape may not occur every time that a setting is changed. In particular, transport requests may be unsent, unreceived, or garbled during transmission. Certain settings may be inadvertently omitted from transport requests, or transport requests may not be prepared. A user may also wish to temporarily test a modified setting on a single system before propagating the setting throughout the landscape, and later forget to propagate or remove the modified setting. Although the likelihood of such events may be small, over time, even well-managed computer system landscapes may include incompatible settings.

Figure 1:
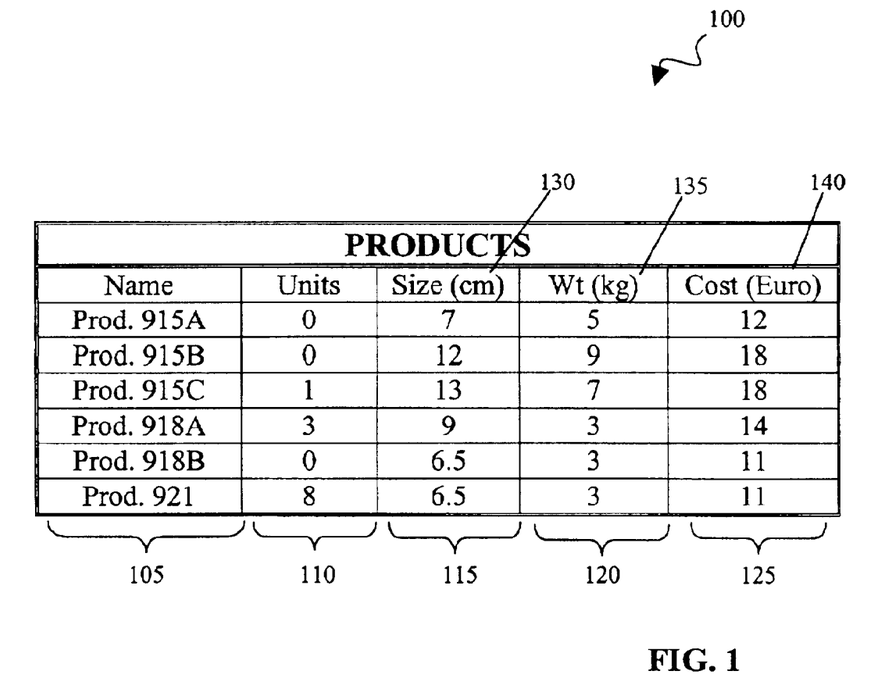
FIGS. 1 and 2 are block diagrams of examples of objects that include parameters which have been customized to certain settings.

For purposes of illustration, FIG. 1 provides an example of a products table 100 that may be an object included in a computer system such as an enterprise resource planning system. Products table 100 describes the former and current products sold by an enterprise, as well as the availability of the products. Products table 100 includes columns of parameters. In particular, the parameters are the name 105, the number of available units in stock 110, the size 115, the weight 120, and the list price 125 of the products of the enterprise. The size, weight, and cost parameters have been customized by settings 130, 135, and 140. In particular, the size parameter 115 is customized to the centimeter setting 130, the weight parameter 120 is customized to the kilogram setting 135, and the list price parameter 125 is customized to the Euro setting 140.

Figure 2:
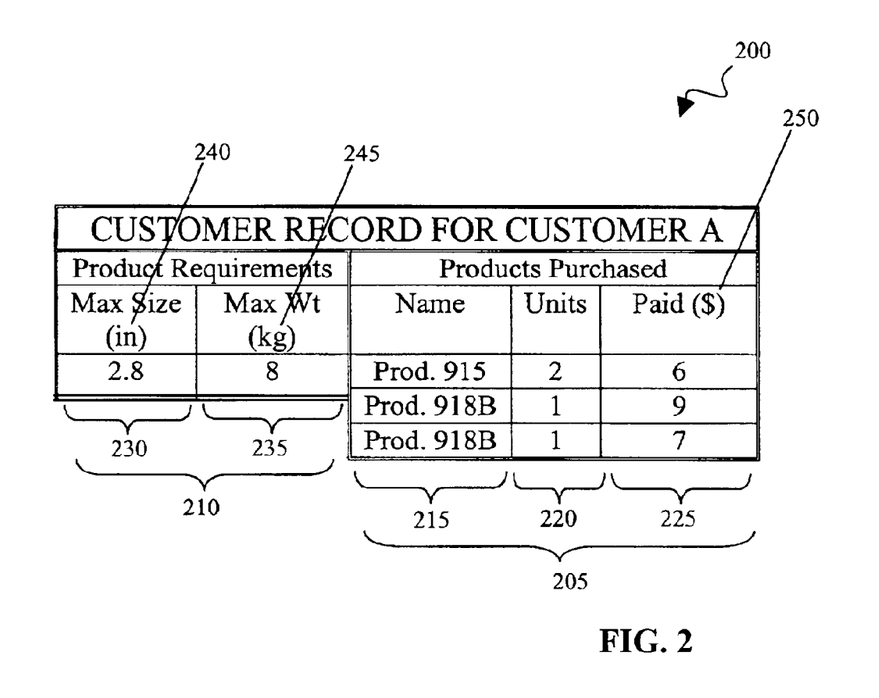

FIG. 2 provides an example of a customer record table 200 that may be included as an object in a customer relationship management system. Customer record table 200 provides a historical record of interactions with a particular customer, such as a table of previous purchases 205 by the customer and information about the product requirements 210 of the customer. Previous purchase table 205 includes columns of parameters such as the names of the purchased products 215, the number of units purchased 220, and the price paid for the products 225. Product requirements 210 may define products that the customer can purchase and may exist due to, for example, operating parameters of the processes that the customer performs with the products or compatibility issues with other equipment. For example, product requirements 210 may define the maximum size 230 and the maximum weight 235 of the products that the customer can purchase.

The parameters 230, 235, and 225 are customized by settings 240, 245, and 250. In particular, the maximum size parameter 230 is customized to the inch setting 240, the maximum weight parameter 235 is customized to the kilogram setting 245, and the purchase price parameter 225 is customized to the dollar setting 250.

If the customization settings of the customizable parameters of objects 100 and 200 are not managed, then the information in objects 100 and 200 may not be directly comparable or transferable. For example, the customer relationship management system may access products table 100 to locate a product that is in stock and that meets the customer's requirements 210. However, because the customization setting 240 customizes the product size requirement parameter 230 to be in inches and the customization setting 130 customizes the product size parameter 115 to be in centimeters, the product size requirement parameter 230 and the product size parameter 115 are not directly comparable.

Figure 3:
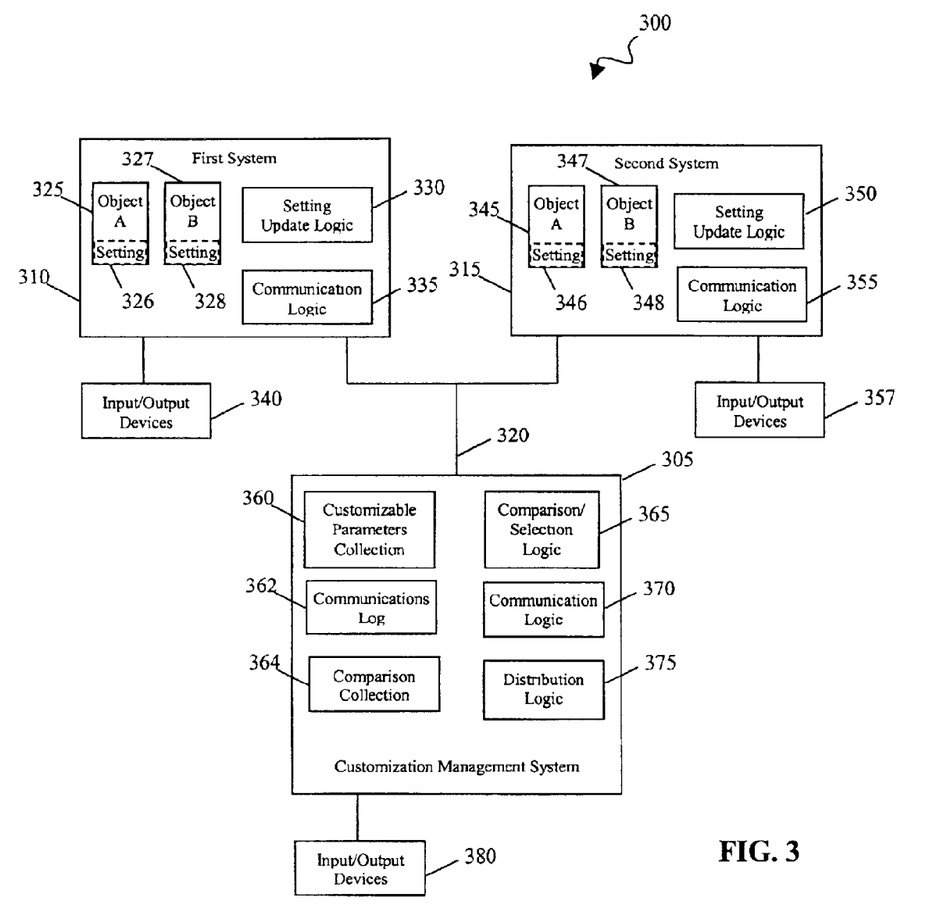
FIG. 3 is a block diagram of a computer system landscape that manages customization.

FIG. 3 shows a system landscape 300 that manages customization, such as the customization of tables 100 and 200. System landscape 300 includes a customization management system 305, a first system 310, and a second system 315. The systems 305, 310, and 315 are joined by a communications link 320. Communications link 320 allows each of systems 310 and 315 to perform inter-system operations that span both of systems 310 and 315. Communications link 320 may be, for example, a computer network that provides data communication between systems 305, 310, and 315, which may be remote from one another.

First system 310 includes a pair of objects 325 and 327 that include data or processes relevant to the operation of first system 310. Object 325 has one or more customized settings 326 of customizable parameters that have been customized to meet specific requirements. Object 327 has one or more customized settings 328 of other customizable parameters that have been customized to meet specific requirements. For example, object 327 may be products table 100 of FIG. 1 and customized setting 328 may be the centimeter setting 130. First system 310 includes update logic 330 for updating customized settings 326 and 328 to meet changes in the specific requirements, and communications logic 335 for processing communications with systems 305 and 315. First system 310 also includes input/output devices 340 for receiving user input and displaying output.

Second system 315 includes a pair of objects 345 and 347 that store data or processes relevant to the operation of second system 315. Object 345 has one or more customized settings 346 for parameters that have been customized to meet specific requirements, and object 347 has one or more customized settings 348 for parameters that have been customized to meet specific requirements. For example, object 347 may be customer record table 200 of FIG. 2 and customized setting 348 may be the inch setting 240. Second system 315 includes update logic 350 for updating customized settings 346 and 348 to meet changes in the specific requirements, and communications logic 355 for processing communicating with systems 305 and 310.

If the customization settings of the customizable parameters are not managed, inter-system operations that span both systems 310 and 315 are complicated. For example, objects 325 and 345 from systems 310 and 315 may not be directly comparable or transferable if the customization of settings 326 and 346 is not managed. Customization management system 305 manages the customization in systems 310 and 315. Customization management system 305 stores a collection of customizable parameters 360, a communications log 362, and a collection 364 of comparisons between settings. Customizable parameters collection 360 is a library of customizable parameters and object classes. The customizable parameters are potentially-customizable in systems 310 and 315. The object classes in customizable parameters collection 360 are potentially impacted by customization of the customizable parameters in systems 310 and 315.

Figure 4:
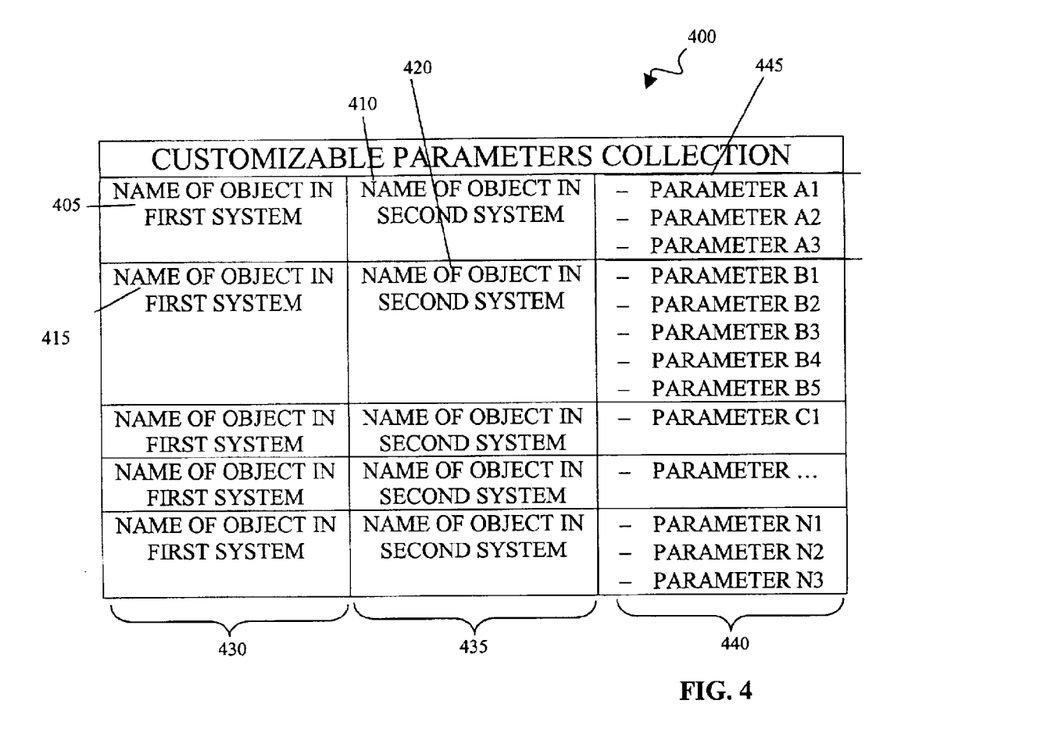
FIG. 4 is a schematic representation of an example collection of customizable parameters.

Referring also to FIG. 4, customizable parameters collection 360 may be implemented as a table 400 of object classes 405, 410, 415, and 420 that are impacted by potentially-customizable parameters. For example, object class 405 may include objects that describe the former and current products of an enterprise, such as products table 100 of FIG. 1. Object class 410 may include objects that provide a historical record of interactions with a particular customer, such as customer record table 200.

Customizable parameters collection 360 may describe object classes 405, 410, 415, and 420 using a column of names 430 of object classes in first system 310, a column of names 435 of object classes in the second system 315, and a column of groups 440 of potentially-customizable parameters that potentially impact the object classes. For example, if object class 405 includes products table 100 and object class 410 includes customer record table 200, then the matching entry 445 in the column of potentially-customizable parameters 440 includes pairs of corresponding parameters such as size parameter 115 and maximum size parameter 230, weight parameter 120 and maximum weight parameter 235, and list price parameter 125 and purchase price parameter 225. Instead of using names, customizable parameters collection 360 can identify object classes 405, 410, 415, and 420 using other distinguishing characteristics, such as, for example, a characteristic file extension. By collecting and associating settings and object classes, a customization manager is able to rapidly identify the objects and the parameters of the identified objects that are impacted by customization.

Communications log 362 is a record of communications between customization management system 305 and systems 310 and 315. Customization management system 305 includes comparison/selection logic 365 for comparing and selecting customization settings, communication logic 370 for processing communicating with systems 310 and 315, and distribution logic 375 for distributing customization information to systems 310 and 315. Customization management system 305 also includes input/output devices 380 for receiving user input and displaying output. Comparisons collection 364 is a record of previous comparisons between settings in systems 310 and 315.

Figure 5:
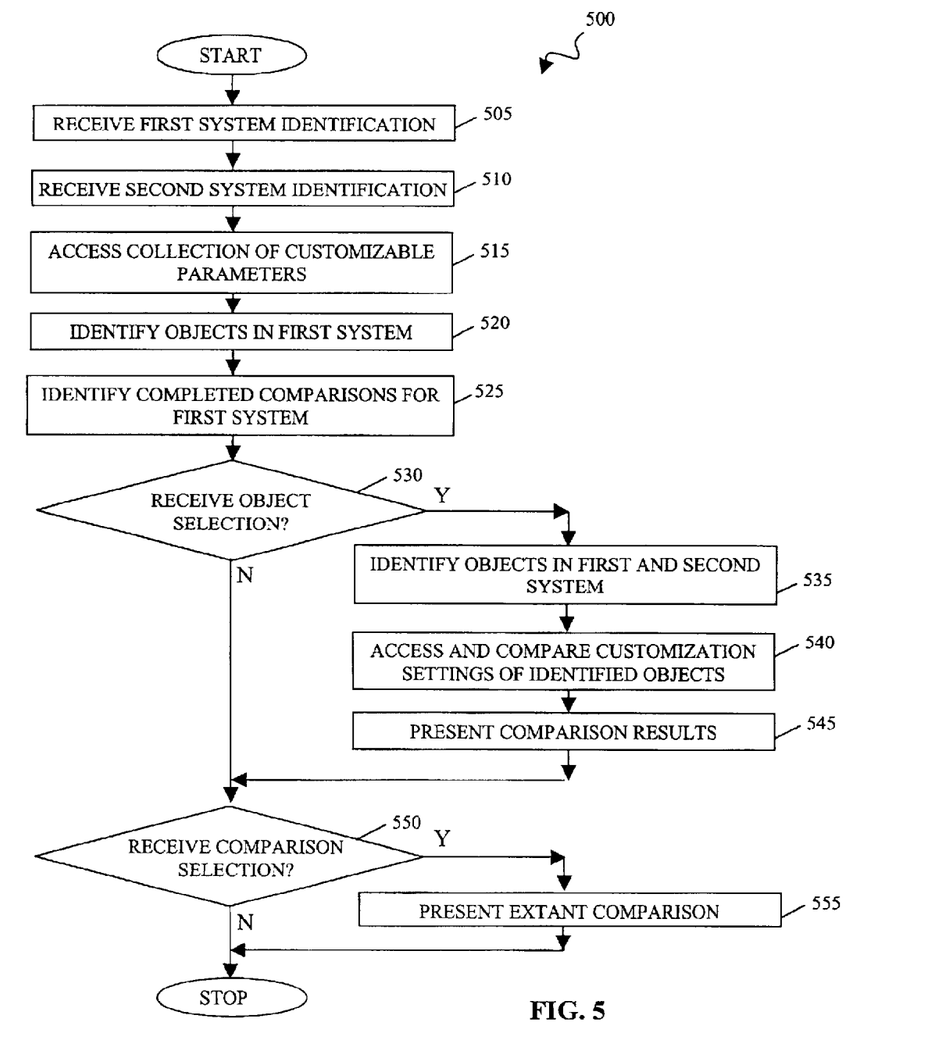
FIGS. 5–8 are flow charts of processes for managing system customization.

Referring also to FIG. 5, in operation, customization management system 305 manages the customization of objects in systems 310 and 315 using a process flow 500. Customization management system 305 first receives, from a user, information identifying the first system 310 and the second system 315 (steps 505 and 510), and that a comparison between at least some customization settings in first system 310 and second system 315 is desired. The user input may be transmitted through input/output devices 380.

Customization management system 305 accesses and examines customizable parameters collection 360 (step 515). In particular, customization management system 305 uses the information in customizable parameters collection 360 to identify object classes with potentially-customizable parameters in first system 310 (step 520). For example, customization management system 305 could use the information in collection 360 to identify the object classes of table 100. Customization management system 305 also identifies completed comparisons between objects in first system 310 and objects in other systems such as second system 315 (step 525) from comparisons collection 364. For example, if a comparison between the object classes of table 100 and the object class of table 200 had been run during the previous week, customization management system 305 identifies the completed comparison, if saved, to the user.

Customization management system 305 displays the identified object classes and completed comparisons using input/output devices 380. Customization management system 305 then determines if it receives a selection identifying one or more object classes from first system 310 for comparison (decision 530), meaning that the user wishes to have a new comparison performed. Customization management system 305 also determines if it receives a selection identifying one or more previously identified completed comparisons (decision 550), meaning that the user wishes to see the results of the completed comparison. The selections may be received from a user through input/output devices 380.

If a selection identifying one or more object classes for a new comparison is received, then customization management system 305 identifies one or more objects from second system 315 and from first system 310 that fall within the selected object class (step 535). For example, customization management system 305 may identify products table 100 and customer record table 200. Customization management system 305 accesses the settings of corresponding parameters of objects from first system 310 and second system 315, and compares their customization settings (step 540). For example, customization management system 305 may access centimeter setting 130 of size parameter 115 of products table 100 and inch setting 240 of product size requirement parameter 230 of customer record table 200. Customization management system 305 may then compare centimeter setting 130 and inch setting 240, and determine that centimeter setting 130 and inch setting 240 differ.

Customization management system 305 presents the results of the comparison by, for example, storing the results, displaying the results to a user, or relaying the results to distribution logic 375 (step 545). For example, customization management system 305 may graphically display a table of objects with differing customization settings, as well as information about the differing customization settings, to the user through input/output devices 380. For example, referring to FIGS. 1 and 2, if customization management system 305 compares customization settings of tables 100 and 200, then customization management system 305 may indicate that size parameter setting 130 is in centimeters, whereas maximum size setting parameter 240 is in inches. Customization management system 305 may also indicate that the weight parameter setting 135 is in kilograms and in accordance with the maximum weight parameter setting 245. If a selection identifying one or more completed comparisons is received, then customization management system 305 presents further details of the identified completed comparison by, for example, retrieving the results from comparisons collection 364 and displaying the results to a user or relaying the results to distribution logic (step 555).

Figure 6:
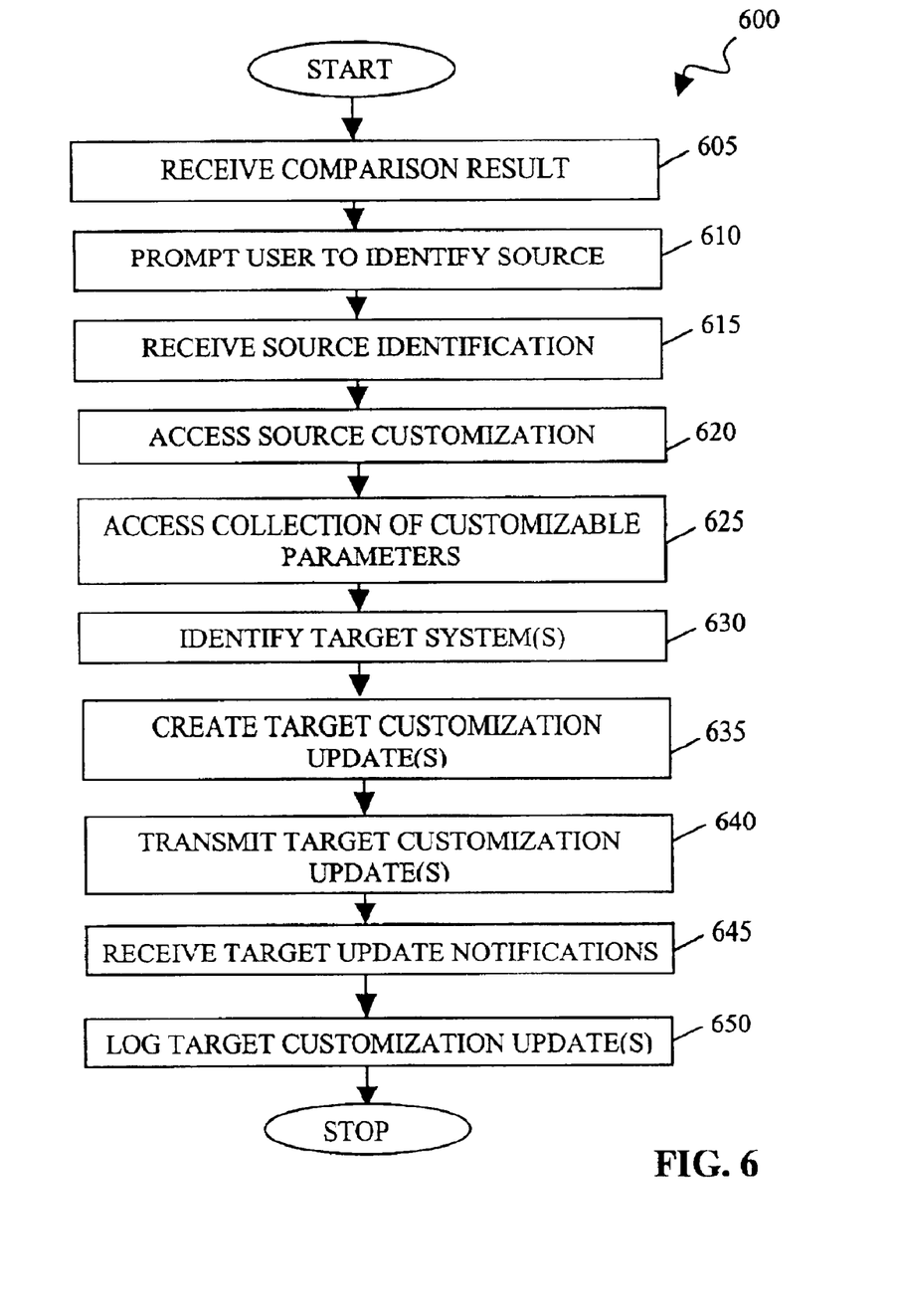

Referring to FIGS. 3 and 6, when the comparison between corresponding settings (step 540 of FIG. 5) indicates that a discrepancy exists, the results of the comparison may be presented to distribution logic 375 in customization management system 305 automatically or under prompting by a user. When executing distribution logic 375, customization management system 305 receives the result of the comparison (step 605) and prompts the user to identify which of the corresponding customization settings is to be the source customization setting (step 610). In other words, customization management system 605 prompts the user to identify which of the corresponding settings is more desirable and is to be distributed to other systems. For example, when the customization management system 305 compares centimeter setting 130 and inch setting 240, customization management system 305 identifies the discrepancy between these settings and prompts the user to identify whether the user wishes to customize the parameters in both objects 100 and 200 to inches or to centimeters.

Customization management system 305 then receives an identification of the source customization setting from the user (step 615). For example, customization management system may receive user input identifying that the user wishes both systems to be customized to display length in centimeters, and that centimeter setting 130 is to be the source setting. Customization management system 305 may access the object with the source customization setting (step 620) to retrieve additional information, if needed.

Customization management system 305 also accesses customizable parameter collection 360 (step 625). Customization management system 305 uses the name of the object class with the identified source customization setting to identify one or more additional target systems that have objects with corresponding parameters in the class (step 630). Customization management system 305 prepares (step 635) and transmits (step 640) messages to the newly-identified target systems, as well as the system in which the original discrepancy was identified. The messages cause the target systems to update the customization settings of the objects with corresponding parameters. When the identified target systems update the customization settings, they respond with an update notification that is received (step 645) and logged (step 650) by customization management system 305.

The customization settings in objects with corresponding parameters in the source and target systems need not be identical. For example, data objects with corresponding parameters may have different settings for currency unit parameters, such as settings 140 and 250 in FIGS. 1 and 2. In cases where such differences do not impact operations with corresponding data objects, customization management system 305 may, for example, omit customization instructions from the update messages or omit selected customization settings from the comparison of corresponding objects.

Figure 7:
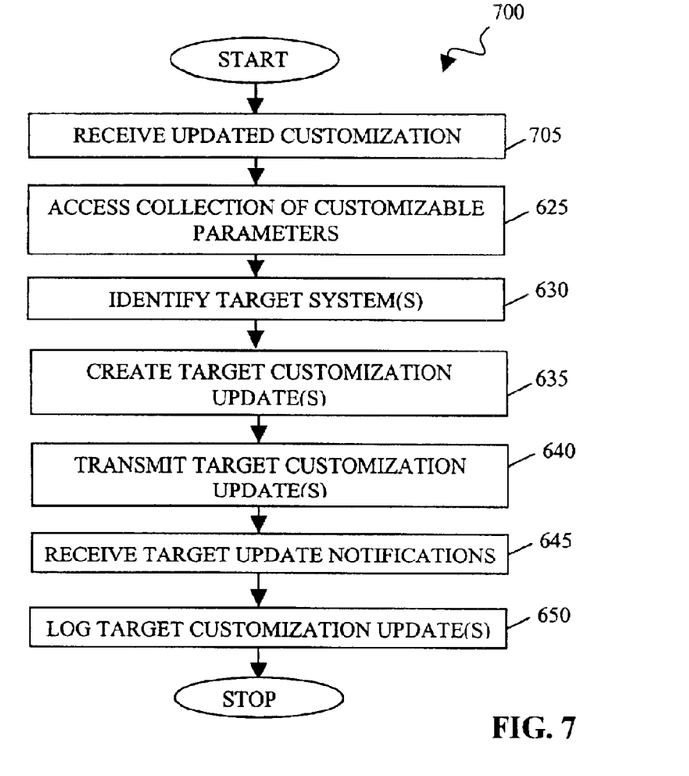

Referring to FIGS. 3 and 7, customization management system 305 can also use a process flow 700 by executing distribution logic 375 to distribute new or updated customization settings. In particular, customization management system 305 can receive a new or updated customization setting for an object or an object class (step 705) from, for example, a user or a source system. Customization management system 305 accesses customizable parameter collection 360 to identify target systems that have objects with corresponding parameters. Customization management system 305 also distributes and logs the update as discussed above with reference to FIG. 6.

Figure 8:
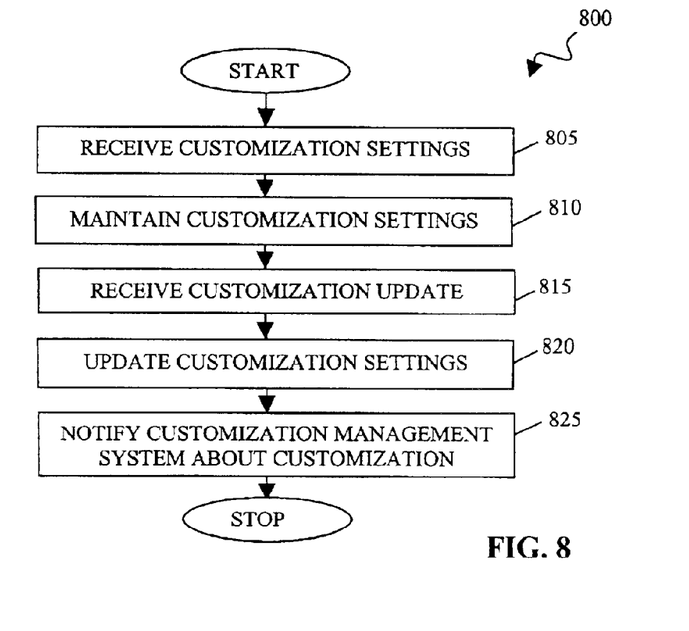

Referring to FIG. 8, a target system can update existing customization settings of the objects with corresponding parameters using a process flow 800. A target system, for example, second system 315, receives (step 805) and maintains (step 810) initial customization settings. The initial customization settings may be received, for example, during system set-up. The initial customization settings may be received directly from a user over input/output devices 357 or the initial customization settings may be received from another system. For example, when a system that includes customer record table 200 is set up, the installer may customize maximum size parameter 230 is to the inch setting 240.

When the second system 315 receives, from customization management system 305, a customization update describing the object class and the source customization settings (step 815), second system 315 updates the customization settings of the objects with corresponding parameters by executing update logic 350. For example, second system 315 may update setting 240 of maximum size parameter 230 to centimeters.

Updating the customization settings of the objects with corresponding parameters can include updating data or processes governed by the customization settings. For example, second system 315 can update the data in maximum size parameter 230 that was previously in English units by converting the data to centimeter units. In response to the update, second system 315 notifies customization management system 305 by transmitting an update notification to customization management system 305.

As described above, customization management system 305 may be prompted to perform process flow 700 by first system 310. In particular, referring to FIGS. 3 and 8, in operation, first system 310 may perform process flow 800 to trigger the management of customization by customization management system 305. In particular, first system 310 also receives (step 805) and maintains (step 810) an initial set of customization settings. First system 310 may later receive a customization update (step 815) from a user over input/output devices 340. First system 310 updates the initial customization settings in accordance with the received update (step 820) and notifies customization management system 305 about the update over communications link 320 (step 825). The notification can include instructions that prompt customization management system 305 to perform process flow 800.

Figure 9:
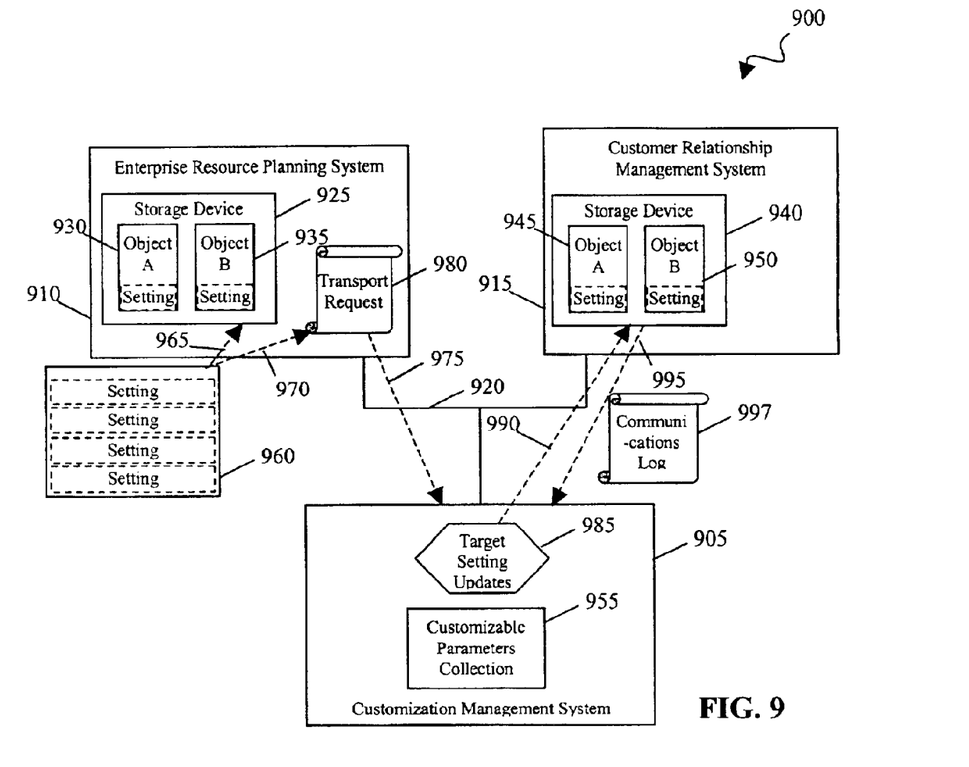
FIG. 9 is a block diagram of another computer system landscape that manages customization.

Referring to FIG. 9, a system landscape 900 that manages customization using process flows 700 and 800 includes a customization management system 905, an enterprise resource planning system 910, and a customer relationship management system 915. An example enterprise resource planning system is the SAP® R/3 system and an example customer relationship management system is the mySAP™ CRM system. The systems 905, 910, and 915 are joined by a communications link 920.

Enterprise resource planning system 910 includes a storage device 925 that stores a pair of objects 930 and 935 with customized settings. Customer relationship management system 915 includes a storage device 940 that stores a second pair of objects 945 and 950 with customized settings. Customization management system 905 stores a collection of customizable parameters 955 in enterprise resource planning system 910 and customer relationship management system 915.

In operation, enterprise resource planning system 910 receives a collection of setting updates 960 from, for example, a user or other computer system. Enterprise resource planning system 910 commits the setting updates 960 into objects 930 and 935 in storage device 925 (dashed arrow 965). Enterprise resource planning system 910 also generates (dashed arrow 970) and transmits (dashed arrow 975) a transport request message 980 to notify customization management system 905 about the incorporation of customization setting updates 960 into objects 930 and 935.

Customization management system 905 receives the transport request message 980 and accesses the collection of customizable parameters 955 to identify target systems such as customer relationship management system 915. Customization management system 905 may access enterprise resource planning system 910 to retrieve setting updates 960 or setting updates 960 may be included in transport request message 980. In either case, customization management system 905 receives some portion of setting updates 960 and creates target update settings 985 for customer relationship management system 910. Customization management system 905 then transmits target update settings 985 to customer relationship management system 915 (dashed arrow 990).

Customer relationship management system 915 receives the appropriate setting updates 960 through target update settings 985, and commits the setting updates 960 into objects 945 and 950 in storage device 940. Customer relationship management system 915 also generates and transmits (dashed arrow 995) a communications log message 997 to notify customization management system 905 about the incorporation of customization setting updates 960 into objects 945 and 950.

The systems and techniques may be implemented in digital electronic circuitry, or in computer hardware, firmware, software, or in combinations of them. Systems may be implemented in a computer program product tangibly embodied in a machine-readable storage device for execution by a programmable processor; and method steps may be performed by a programmable processor executing a program of instructions to perform functions by operating on input data and generating output. The systems and techniques may be implemented advantageously in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, ASICs ("application-specific integrated circuits").

To provide for interaction with a user, the systems and techniques may be implemented on a computer system having a display device such as a monitor or LCD screen for displaying information to the user and a keyboard and a pointing device such as a mouse or a trackball by which the user can provide input to the computer system. The computer system may be programmed to provide a graphical user interface through which computer programs interact with users.

A number of implementations have been described. Nevertheless, it will be understood that various modifications may be made. For example, the customization management system may be a central system and the source and target systems may be remote from the central system, or the customization management system may be an application that runs on the source and target systems.

Accordingly, other implementations are within the scope of the following claims.

What is claimed is:

1. A computer program product, tangibly stored on machine readable media, for managing customization, the product comprising instructions to cause a processor to:

access a customizable parameter collection that includes a collection of potentially-customizable parameters, each potentially-customizable parameter being associated with a first data object used by a first software module executing on a first computer system and being associated with a second data object used by second software module executing on a second computer system;

identify a first computer system and a second computer system that are potentially impacted by a particular customizable parameter in the collection;

retrieve a first settings of the particular customizable parameter from the first computer system and a second setting of the particular customizable parameter from the second computer system; and compare the first setting with the second setting, wherein the computer program product is located on a computer system other than the first computer system and the second computer system.

2. The product of claim 1 further comprising instructions to display a result of the comparison between the retrieved first setting and the second setting.

3. The product of claim 1 wherein the collection of potentially-customizable parameters are stored in a table with information identifying objects impacted by the potentially-customizable parameters.

4. A computer system for managing customizable settings, the system comprising:

a data repository for customizable parameters for software, each customizable parameter being associated with a first data object used by a first software module executing on a first computer system and being associated with a second data object used by second software module executing on a second computer system; and an executable software module that causes a comparison of a first setting for a particular customizable parameter associated with the first data object with a second setting for the particular customizable parameter associated with the second data object, wherein the data repository and the executable software module are located on the computer system that is a computer system other than the first computer system and the second computer system.

5. The computer system of claim 4 wherein the executable software module causes a display of the first setting and the second setting of the particular customizable parameter.

6. The computer system of claim 5 wherein the executable software module causes a display of the first setting and the second setting of the particular customizable parameter only when the first setting is not compatible with the second setting.

7. The computer system of claim 4 wherein the executable software module causes the first setting to be compatible with the second setting only when the first setting is not compatible with the second setting.

* * * * *